(12) United States Patent
Anand et al.

(10) Patent No.: US 9,519,774 B2
(45) Date of Patent: Dec. 13, 2016

(54) SYSTEMS AND METHODS FOR SQL QUERY CONSTRAINT SOLVING

(71) Applicant: Prevoty, Inc., Los Angeles, CA (US)

(72) Inventors: Kunal Anand, San Jose, CA (US);
Joseph Rozner, Northridge, CA (US);
Merritt Carl Vincent, Buena Park, CA (US); Stephen Weinberg, Los Angeles, CA (US)

(73) Assignee: PREVOTY, INC., Los Angeles, CA (US)

( * ) Notice: Subject to any disclaimer, the term of this patent is extended or adjusted under 35 U.S.C. 154(b) by 0 days.

(21) Appl. No.: 14/599,978

(22) Filed: Jan. 19, 2015

(65) Prior Publication Data

US 2015/0205951 A1    Jul. 23, 2015

Related U.S. Application Data

(60) Provisional application No. 61/929,474, filed on Jan. 20, 2014.

(51) Int. Cl.
*G06F 21/52* (2013.01)
*G06F 17/30* (2006.01)
*G06F 21/57* (2013.01)

(52) U.S. Cl.
CPC ........... *G06F 21/52* (2013.01); *G06F 17/3051* (2013.01); *G06F 17/30371* (2013.01); *G06F 21/577* (2013.01); *G06F 2221/033* (2013.01)

(58) Field of Classification Search
CPC ..... G06F 21/52; G06F 21/577; G06F 17/3051
USPC .......................................................... 726/25
See application file for complete search history.

(56) References Cited

U.S. PATENT DOCUMENTS

| | | | |
|---|---|---|---|
| 7,437,362 B1* | 10/2008 | Ben-Natan | G06F 21/6227 |
| 2005/0203921 A1* | 9/2005 | Newman | G06F 21/6227 |
| 2007/0208693 A1* | 9/2007 | Chang | G06F 17/30958 |
| 2010/0228693 A1* | 9/2010 | Dawson | G06F 17/2705 706/12 |
| 2012/0192280 A1* | 7/2012 | Venkatakrishnan | G06F 21/6227 726/25 |
| 2015/0205951 A1* | 7/2015 | Anand | G06F 17/30371 726/25 |

\* cited by examiner

*Primary Examiner* — Dao Ho
(74) *Attorney, Agent, or Firm* — Kang S. Lim

(57) ABSTRACT

The present invention relates to systems and methods for analyzing SQL queries for constraint violations, which may indicate injection attacks. The systems and methods tokenize a SQL query to generate a token stream. Next, lexical nodes are generated by iterating over the token stream. Then, a parse tree can be constructed by iterating over the lexical nodes. The parse tree may be compared to a SQL schema and access configuration for a database in order to analyze the SQL query for constraint violations, including determining the number of queries in the parse tree, identifying invalid fields and table access, identifying invalid field type comparisons and pattern matches, and identifying early statement termination.

14 Claims, 5 Drawing Sheets

SYSTEMS AND METHODS FOR SQL QUERY CONSTRAINT SOLVING

CROSS-REFERENCE TO RELATED APPLICATIONS

This non-provisional application claims the benefit of and is a continuation-in-part of U.S. provisional patent application No. 61/929,474, filed on Jan. 20, 2014, of same title, which application is hereby fully incorporated in its entirety by this reference.

BACKGROUND

The present invention relates to systems and methods for preventing malicious attacks on relational database management systems (RDBMS). In particular, the present systems and methods include novel means for determining the likelihood of a structured query language (SQL) injection attack and other security risks.

With the proliferation of online activity, there has been an equally robust increase in the numbers of attacks. These attacks enable malicious parties to gain personal (and potentially sensitive) information on individuals, redirect users to malicious websites, track their browsing, and otherwise take advantage of users, often without them being aware of the attack.

One common vector of attacks is SQL injection. SQL injection is designed to tamper or steal sensitive information from data-driven web applications. This is accomplished by providing fragments of a SQL query into an input variable, supplied by a web application user. When the input is evaluated by the application, the tainted SQL query is executed, allowing attackers to CRUD (create, read, update, delete) information from a database.

There are limited methods currently employed to avert SQL injection attacks. Rarely are there requirements placed on SQL entries that attempt to redress SQL injection attacks. More often blacklists, in the form of string replacements and regular expressions, are employed to restrict known threats from accessing the databases. However, generally, there is insufficient means for accurately assessing the risk of a SQL query and especially, an input variable that may contain a SQL query.

It is therefore apparent that an urgent need exists for improved systems and methods for analyzing SQL queries in order to identify potential injection attacks. Such systems and methods enable the generation of reports on the SQL query which may be employed for attack prevention.

SUMMARY

To achieve the foregoing and in accordance with the present invention, systems and methods for analyzing SQL queries for constraint violations, which may indicate injection attacks. Such systems and methods enable the identification and possibly prevention, of such attacks. This increases database security where employed.

In some embodiments, the systems and methods tokenizing a SQL query to generate a token stream. Next lexical nodes are generated by iterating over the token stream. Then a parse tree can be constructed by iterating over the lexical nodes. The parse tree may be compared to a SQL schema and access configuration for a database in order to analyze the SQL query for constraint violations.

The analyzing for constraint violations includes determining the number of queries in the parse tree. This may be performed by identifying multiple SQL statements, delineating by a query separator or identifying sub-queries in relevant query commands and operators.

Another constraint violation analyzed for is identifying invalid fields and table access. This is determined by identifying parse tree identifiers for fields or tables that do not exist or for which access is restricted. In a similar vein, identifying invalid field type comparisons and pattern matches may also be performed. This includes identifying where the field input mismatches the SQL query function, or where field are compared by the SQL query which are restricted from being compared by the access configuration.

Lastly, identifying early statement termination is another constraint violation which may be analyzed for. A report of all the constraint violations may be output. In other embodiments, remedial measures may be taken to reduce risk exposure for SQL queries that are likely harboring a SQL injection attack.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to novel systems and methods for identifying and preventing attacks on databases via SQL injection. Unlike previous systems that utilize blacklists or other rudimentary means for restricting access to these databases, the present system utilizes a process for analyzing SQL queries in order to identify characteristics that indicate that the query may include an attack. The resulting reports of the SQL query may indicate the likelihood that the query is valid versus a potential security risk. These reports may be utilized to drive mitigation policies; which enables a higher degree of protection for databases.

Figure 1:
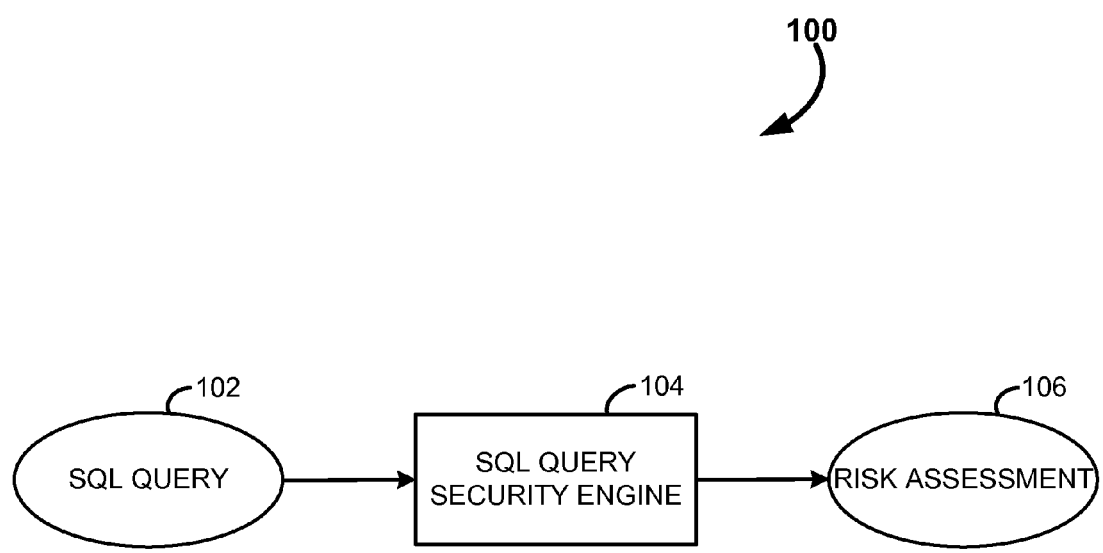
FIG. 1 is a schematic block diagram for the system for SQL query security, in association with some embodiments.

Turning to FIG. 1, shown generally at 100, the system includes an incoming SQL query 102 which is filtered through a SQL query security engine 104. The SQL query security engine 104 may analyze the SQL query 102 to determine the degree of risk of an injection attack the query poses. The output of the SQL query security engine 104 is a risk assessment report 106.

In some embodiments, this risk assessment may merely include a summary report of the security-specific analytics. The end-user/application may then utilize this assessment to apply their own policies regarding SQL risks, and implement a customized mitigation strategy.

In alternate embodiments, the SQL query security engine 104 may actively block the SQL query, or otherwise sterilize it, when particular risk profiles are reached. For example, if an SQL query includes a request to access multiple fields in a database table, and some of the indicated fields are restricted fields, the system may outright restrict the query, or only return the unrestricted data, dependent upon risk profiles and/or configuration of the risk mitigation.

Figure 2:
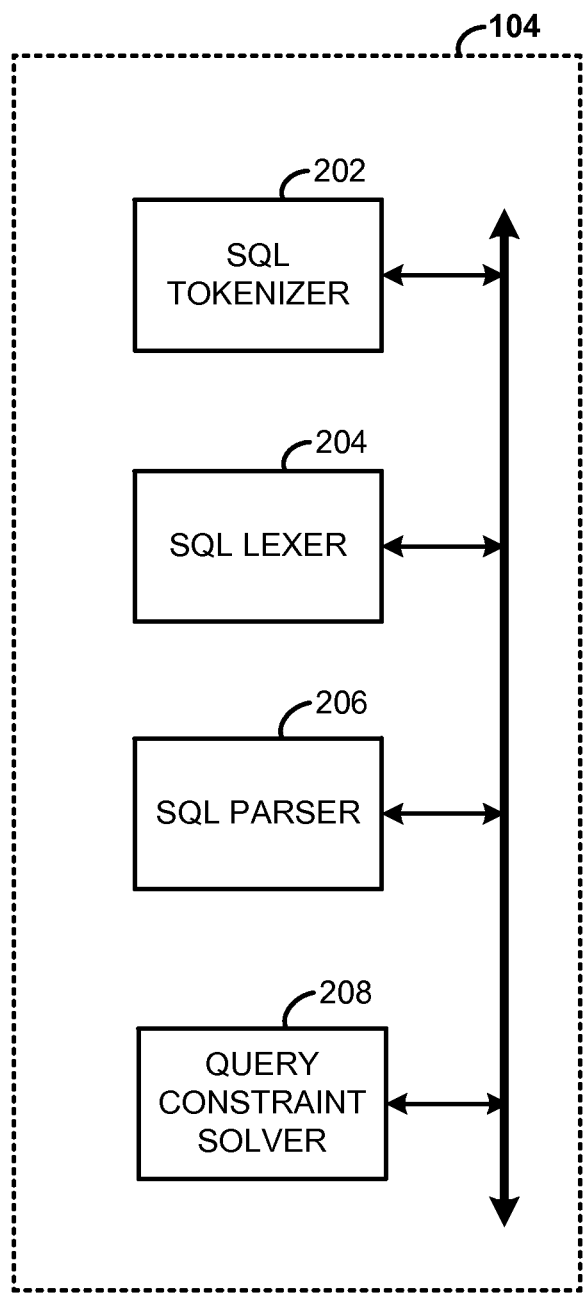
FIG. 2 is a more detailed schematic block diagram for the subcomponents of the SQL security system, in association with some embodiments.

FIG. 2 provides a more detailed view of the subcomponents of the SQL query security engine 104. These include a SQL tokenizer 202, a SQL lexer 204, a SQL parser 206, and a query constraint solver 208. Each of these components may be logically or physically coupled to one another.

In order for constraint solving to be performed, the SQL query must first be converted into a valid parse tree. The development of a valid parse tree is known, and may be accomplished in a number of ways. However, for the sake of this disclosure, one example of the construction of a parse tree will be provided for clarity.

An SQL query may be stand alone or may be within the context of another string. The SQL query is constructed as a sequence of bytes with a provided encoding (e.g., ASCII, Latin-1, or UTF-8). The encoding is needed for knowing how to tokenize the SQL query. The SQL tokenizer 202 consumes the byte sequence and produces a token stream. The token stream is a stream of characters, numbers and punctuation.

The SQL lexer 204 iterates over the token stream to produce a tree of lexical nodes. This process basically chunks the token stream into SQL commands, SQL functions and field/table identifiers, for example.

The SQL parser 206 iterates over the lexical nodes to determine query structure and validity (i.e., fits the rules for a valid SQL statement). This results in a parse tree. As previously mentioned, the generation of a parse tree from a SQL query is known, and as such description of these processes are left purposefully broad as to not over-clutter the disclosure with extraneous verbiage.

Once the parse tree is derived, however, the query constraint solver 208 may perform novel analysis on the SQL query to determine its risk profile. The query constraint solver 208 utilizes the parse tree as an input, and also utilizes a SQL schema, and an access configuration for the database as reference. The SQL schema includes a breakdown of the existing database tables with their corresponding fields and type information. The query constraint solver 208 compares the SQL query parse tree to the schema and access configurations to determine the number of queries, invalid field access, invalid field type comparisons, and early statement terminations. Each of these activities is an indicator of a SQL injection attack. The results of the analysis may be reported in raw form, or may be compared against risk profiles in order to generate a risk value for the query. In some cases, the risk value may be a simple 'high, medium, low' risk designation. In alternate embodiments, a percentile, or other indicator, may be provided for the query indicating its likelihood of harboring an injection attack.

Figure 3:
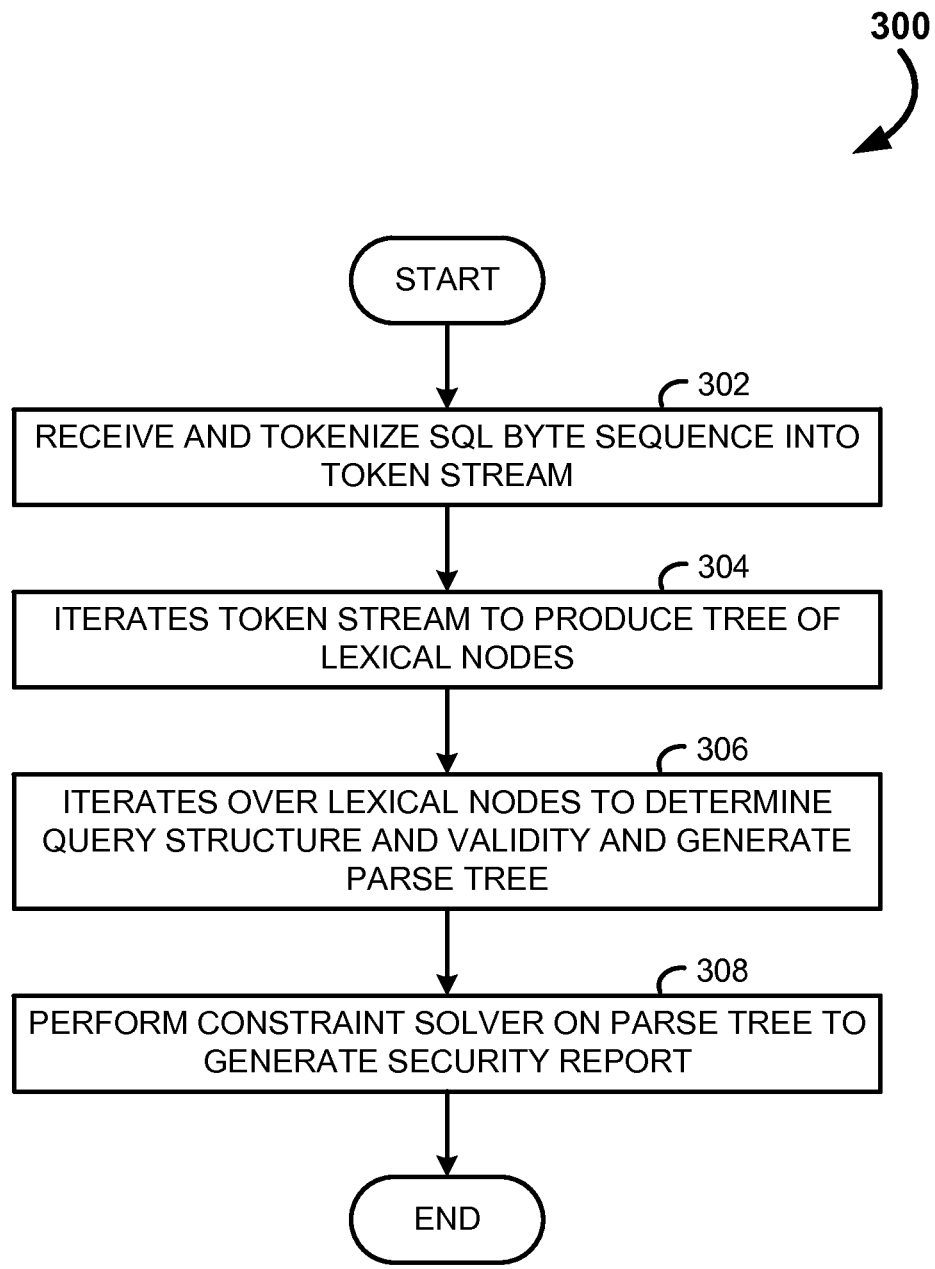
FIGS. 3 and 4 are example flow charts for the process of SQL query constraint solving, in accordance with some embodiments.

FIG. 3 provides an example flowchart, shown generally at 300, for the process of query constraint solving. As previously discussed, the first three steps prepare the SQL query for constraint analysis. These include receiving the SQL string and tokenizing it into a token stream (at 302), iterating over the token stream to generate lexical nodes (at 304), and parsing the lexical nodes to determine query structure and validity (at 306). These initial steps result in a parse tree which may be analyzed in the following step.

The parse tree is utilized for constraint solving (at 308). Constraint solving results in a security risk assessment, in some embodiments, where aspects of the query are simply reported out for action by the recipient. In other embodiments, the constraint solver may take additional risk mitigation steps, as previously mentioned. These additional steps may include designating likelihood of the SQL query including an injection attack, or even taking steps to minimize intrusion by detected SQL injection attempts (e.g., blocking access, altering SQL query to remove offending portions, etc.).

Figure 4:
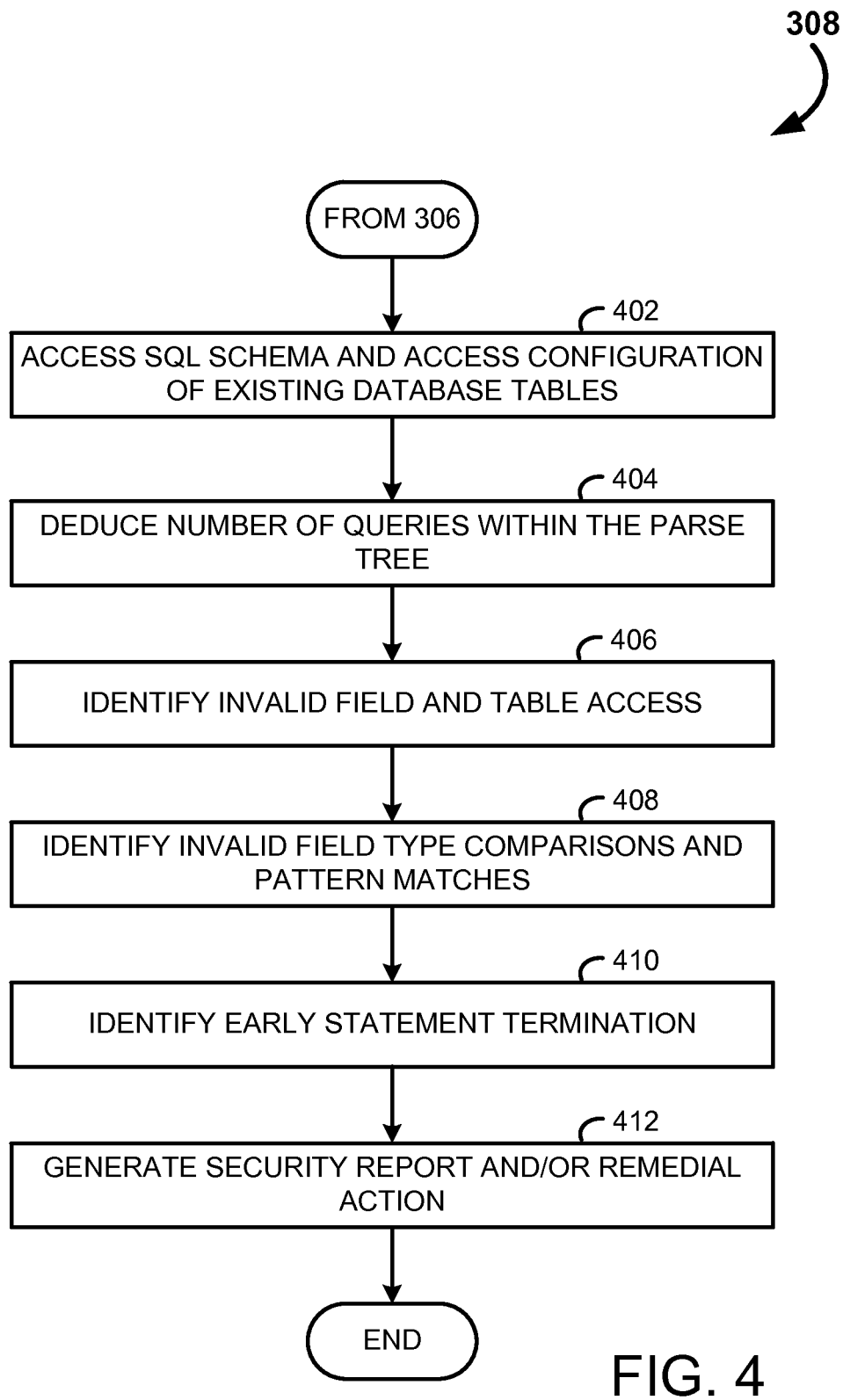

FIG. 4 provides a more detailed process of the constraint solver. This process starts by accessing (at 402) the SQL schema and access configuration, as described previously. The process then proceeds to compare the parse tree to these constraints. This enables the system to identify number of queries within the parse tree (at 404). This may include identifying query separators (such as semicolons) or subqueries (such as table joins and nested selections).

Next, invalid field and table access attempts are identified (at 406). This analysis is performed by matching the parse tree field/table identifiers against the access configurations and database schema. If the parse tree is attempting to access a field that does not exist, or to which there is restricted access, the query may be flagged as including an invalid access.

Likewise, invalid field type comparisons and pattern matches are identified (at 408). This identification may utilize a string comparison for an integer field, or fields, that should not be compared based on the access configuration. If the SQL query is requesting such a comparison, then it is flagged for an invalid field type comparison.

Lastly, early termination statements are identified (at 410). These early termination statements may take the form of an SQL comment used to break up commands, functions and/or identifiers, for example.

The output of the SQL constraint solving process is a tree that includes specific information about constraint violations, as identified above. This tree may be output in its raw form, or as a summary report as metadata to the SQL query (at 412). Alternatively, as discussed previously, remedial measures may be employed to reduce risk of an injection attack.

Figure 5A:
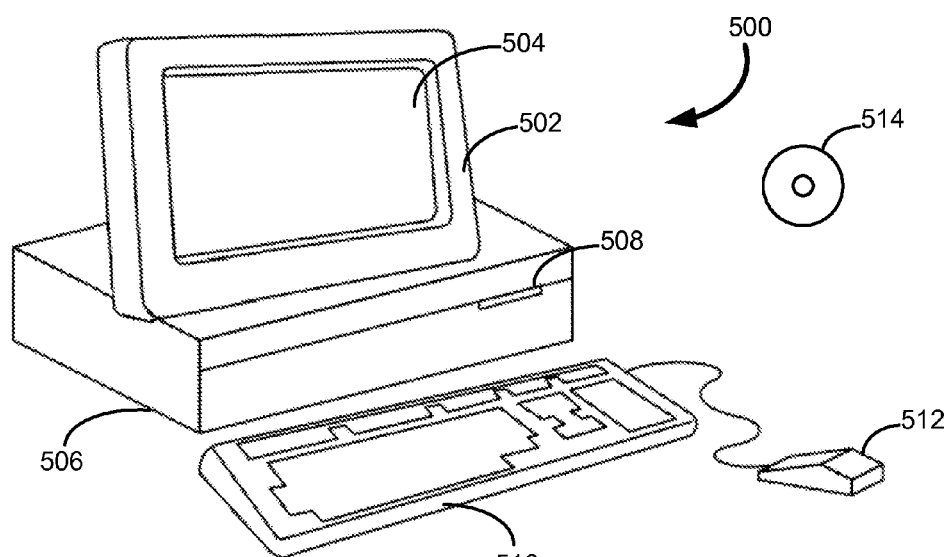
FIGS. 5A and 5B are example illustrations for computer systems configured capable of SQL query constraint solving, in accordance with some embodiments.
Figure 5B:
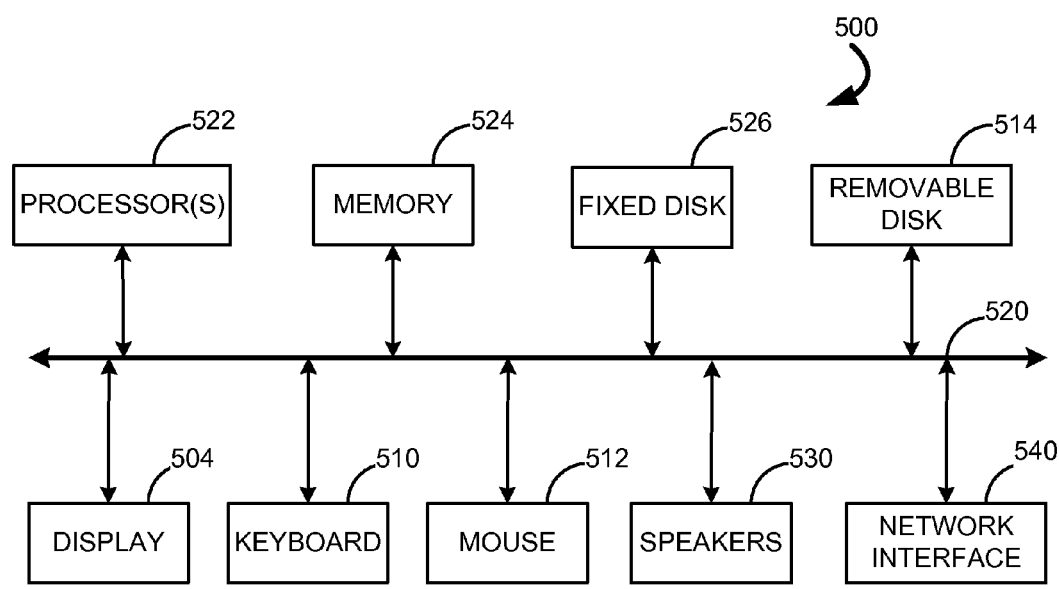

FIGS. 5A and 5B illustrate a Computer System 500, which is suitable for implementing embodiments of the present invention. FIG. 5A shows one possible physical form of the Computer System 500. Of course, the Computer System 500 may have many physical forms ranging from a printed circuit board, an integrated circuit, and a small handheld device up to a huge super computer. Computer system 500 may include a Monitor 502, a Display 504, a Housing 506, a Disk Drive 508, a Keyboard 510, and a Mouse 512. Disk 514 is a computer-readable medium used to transfer data to and from Computer System 500.

FIG. 5B is an example of a block diagram for Computer System 500. Attached to System Bus 520 are a wide variety of subsystems. Processor(s) 522 (also referred to as central processing units, or CPUs) are coupled to storage devices, including Memory 524. Memory 524 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 526 may also be coupled bi-directionally to the Processor 522; it provides additional data storage capacity and may also include any of the computer-readable media described below. Fixed Disk 526 may be used to store programs, data, and the like and is typically a secondary storage medium (such as a hard disk) that is slower than primary storage. It will be appreciated that the information retained within Fixed Disk 526 may, in appropriate cases, be incorporated in standard fashion as virtual memory in Memory 524. Removable Disk 514 may take the form of any of the computer-readable media described below.

Processor 522 is also coupled to a variety of input/output devices, such as Display 504, Keyboard 510, Mouse 512 and Speakers 530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 522 optionally may be coupled to another computer or telecommunications network using Network Interface 540. With such a Network Interface 540, it is contemplated that the Processor 522 might receive information from the network, or might output information to the network in the course of performing the above-described SQL constraint solving. Furthermore, method embodiments of the present invention may execute solely upon Processor 522 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

In sum, the present invention provides systems and methods for analyzing SQL queries for constraint violations, which may indicate injection attacks. Such systems and methods enable the identification and possibly prevention, of such attacks. This increases database security where employed.

While various aspects and embodiments have been disclosed in the present invention, other aspects and embodiments will be apparent to those skilled in the art. The various aspects and embodiments disclosed herein are for purposes of illustration and are not intended to be limiting. The true scope and spirit are indicated by the following claims, along with the full scope of equivalents to which such claims are entitled. Furthermore, the terminology used herein is for the purpose of describing particular embodiments only and is not intended to be limiting in any way.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for analyzing SQL queries for constraint violations comprising:
   tokenizing a SQL query to generate a token stream;
   generating lexical nodes by iterating over the token stream to chunk into SQL commands, SQL functions and field/table identifiers;
   constructing a parse tree by iterating over the lexical nodes;
   analyzing, using a processor, the parse tree for constraint violations by comparing the parse tree to a SQL schema and access configuration for a database, wherein the analyzing includes identifying invalid fields and table access, wherein identifying invalid fields and table access comprises identifying parse tree identifiers for fields or tables that do not exist or for which access is restricted; and
   performing risk mitigation for SQL queries that are likely harboring an SQL injection attack.

2. The method of claim 1, wherein the analyzing includes determining the number of queries in the parse tree.

3. The method of claim 2, further comprising at least one of identifying multiple SQL statements, delineating by a query separator, and identifying sub-queries.

4. The method of claim 1, wherein the analyzing includes identifying invalid field type comparisons and pattern matches.

5. The method of claim 4, wherein identifying invalid field type comparisons and pattern matches comprises identifying where the field input mismatches the SQL query function, or where field are compared by the SQL query which are restricted from being compared by the access configuration.

6. The method of claim 1, wherein the analyzing includes identifying early statement termination.

7. The method of claim 1, further comprising outputting a report of the analysis.

8. A system for analyzing SQL queries for constraint violations comprising:
   a processor executing computer readable medium to:
   tokenize a SQL query to generate a token stream;
   generate lexical nodes by iterating over the token stream to chunk into SQL commands, SQL functions and field/table identifiers;
   construct a parse tree by iterating over the lexical nodes;
   analyze the parse tree for constraint violations by comparing the parse tree to a SQL schema and access configuration for a database, wherein the query constraint solver is further configured to identify invalid fields and table access, wherein identifying invalid fields and table access comprises identifying parse tree identifiers for fields or tables that do not exist or for which access is restricted; and
   perform risk mitigation for SQL queries that are likely harboring an SQL injection attack.

9. The system of claim 8, wherein the query constraint solver is further configured to determine the number of queries in the parse tree.

10. The system of claim 9, the query constraint solver is further configured to identify multiple SQL statements, delineate by a query separator, and identify sub-queries.

11. The system of claim 8, wherein the query constraint solver is further configured to identify invalid field type comparisons and pattern matches.

12. The system of claim 11, wherein identifying invalid field type comparisons and pattern matches comprises identifying where the field input mismatches the SQL query function, or where field are compared by the SQL query which are restricted from being compared by the access configuration.

13. The system of claim 8, wherein the query constraint solver is further configured to identify early statement termination.

14. The system of claim 8, the query constraint solver is further configured to output a report of the analysis.

* * * * *